Figure 1:
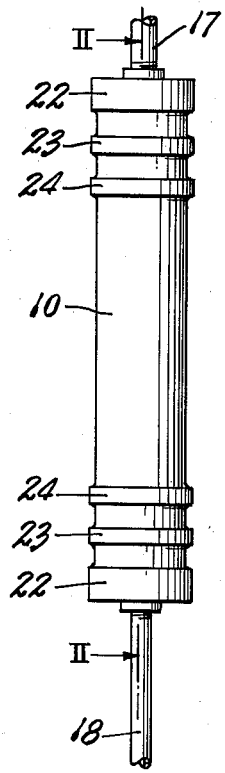

June 1, 1954 — C. E. DEARDORFF — 2,679,948

BAND-REINFORCED HYDRAULIC CYLINDER

Filed Nov. 17, 1950

INVENTOR.
C. E. DEARDORFF
BY
ATTORNEY

Patented June 1, 1954

2,679,948

UNITED STATES PATENT OFFICE 2,679,948

BAND-REINFORCED HYDRAULIC CYLINDER

Clinton E. Deardorff, San Fernando, Calif., assignor to Bendix Aviation Corporation, South Bend, Ind., a corporation of Delaware Application November 17, 1950, Serial No. 196,256

1 Claim. (Cl. 220—71)

This invention relates to cylindrical hydraulic pressure devices exposed to gun fire damage, and particularly to such devices for use on aircraft where weight is a factor.

An object of the invention is to provide a cylinder structure for high pressure hydraulic systems that is light in weight and yet is not apt to explode and produce secondary damage when punctured by a bullet or other projectile.

The invention is particularly useful in cylindrical accumulators for high pressure hydraulic systems on aircraft, such accumulators, even though made sufficiently strong to safely withstand pressures much greater than any steady-state pressure than can exist in service, often explode or tear apart, with disastrous results to adjacent personnel and apparatus, when punctured by a bullet or the like. Apparently the entrance of the bullet produces shock waves in the fluid within the accumulator which cause transient pressures enormous in value. These transient pressures, coupled with the rupture-initiating action of the bullet itself often tear the cylinder wide open and project portions of the cylinder or parts therewithin at high velocity.

In accordance with the present invention, extensive tearing of a high pressure cylinder in response to penetration by a projectile is curbed without materially increasing its weight by providing one or more separate external bands tightly fitted on the exterior of the cylinder. It is found that such bands stop tearing of the cylinder where a corresponding increase in the thickness of the cylinder wall itself does not. It has been found by test that the most dangerous tears are those extending to an end of the cylinder, and such tears can be controlled by a single band on the end. The bands are initially of slightly smaller internal diameter than the external diameter of the cylinder, are expanded by heat prior to application, and shrunk in place on the cylinder.

Figure 2:
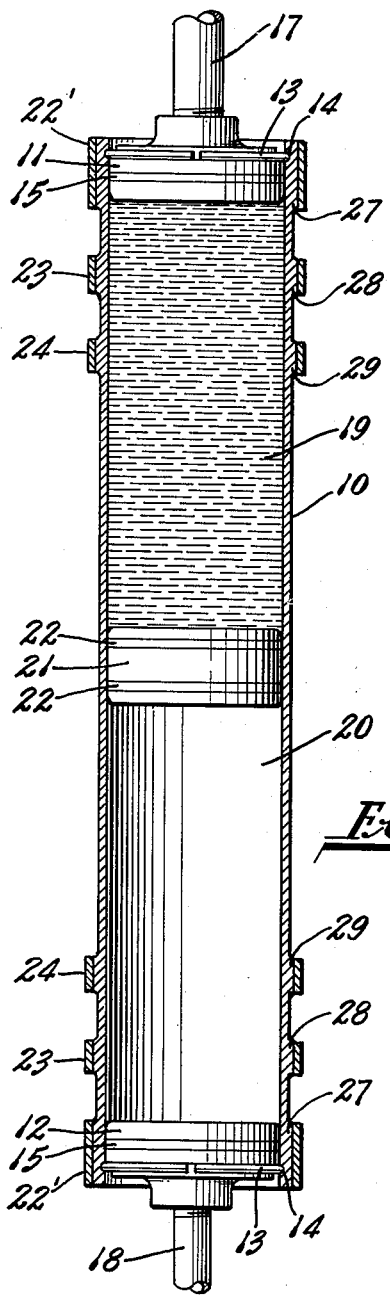

A full understanding of the invention may be had from the following description read in connection with the drawing, in which:

Fig. 1 is a side elevational view of a cylindrical accumulator in accordance with the invention; and Fig. 2 is a longitudinal sectional view thereof.

Referring to the drawing, the accumulator depicted therein comprises a cylinder 10 that is open at both ends for the reception of end closure plugs 11 and 12 respectively. Each of these plugs 11 and 12 is dimensioned to fit closely within an end of the cylinder, and is retained in position by a retaining ring 13 fitted in a groove 14 in the inner surface of the cylinder 10. Each closure plug 11 may be sealed with a conventional sealing ring 15 to prevent fluid leakage. Each closure plug has a passage therethrough adapted to be connected to a pipe 17 or 18 for effecting communication with the adjacent end of the cylinder 10. The interior of the cylinder is divided into two inversely variable compartments 19 and 20 respectively by a free piston 21, which may have conventional sealing rings 22 thereon for effecting a seal with the cylinder wall. In use, one compartment—in this instance the compartment 19, is filled with fluid and is connected by the pipe 17 to the fluid line of a hydraulic system. The other compartment 20 contains a gas such as air which is compressible and may be connected by the pipe 18 to a source of pressure gas. Ordinarily the gas compartment 20 is filled with gas at a suitable pressure, and the pipe 18 is closed by a suitable valve therein (not shown). Thereafter if the pressure of the fluid in the hydraulic system to which the device is connected rises, fluid flows from the system through the pipe 17 into the compartment 19, moving the free piston 21 downwardly and further compressing the gas in the chamber 20. At a subsequent time, when the pressure drops in the hydraulic system, the chamber 19 supplies fluid thereto, the pressure of the gas in the compartment 20 moving the piston 21 upwardly to force the fluid out of the chamber 19.

The device as so far described is old and does not constitute any invention.

The present invention resides in the provision of reinforcing bands 22', 23 and 24 on the exterior of the cylinder 10.

These bands 22', 23 and 24 may be of relatively limited extent longitudinally of the cylinder, and are in no sense necessary to prevent bursting of the cylinder in response to hydraulic pressures to which it is normally exposed. The wall thickness of the cylinder 10 is made ample to resist such normal forces. It is found however that the separate bands 22', 23 and 24 greatly hamper and impede tearing of the wall of the cylinder 10 in response to shock waves created by a bullet or other projectile penetrating the cylinder, being much more effective than would a correspondingly increased thickness of the cylinder wall 10 itself.

It is convenient in manufacture to form the bands 22', 23 and 24 of slightly smaller internal diameter than the external diameter of the cylinder where they are to be seated when both parts are at the same temperature, and expand the bands by heating immediately prior to application on the cylinder. The bands then shrink tightly onto the cylinder during the process of cooling to the cylinder temperature. Conversely, the cylinder 10 could be chilled to a temperature below normal temperature to permit application of bands either at the ambient temperature or at a temperature above the ambient.

It has been found convenient and desirable in the manufacture of these accumulators to form on the exterior surface of the cylinder 10 itself lands 27, 28 and 29 as seating surfaces for the reinforcing bands 22', 23 and 24, the external diameters of the lands being slightly greater than the internal diameter of the bands. It is easy to machine the external surfaces of the lands to the exact diameter desired without making their diameters less than the external diameter of the rest of the cylinder 10. This facilitates the placing of the bands 23 and 24 which are positioned inwardly of the end bands 22'.

It is desirable to locate the reinforcing bands near the ends of the cylinder 10, because the greatest damage in response to puncture of the cylinder by gun fire usually occurs from tears that extend clear to the end of the cylinder, such tears often permitting the projection of parts such as the closure plugs 11 or 12 at high velocity.

Although for the purpose of explaining the invention, a particular embodiment thereof has been shown and described, obvious modifications will occur to a person skilled in the art, and I do not desire to be limited to the exact details shown and described.

I claim:

A cylinder for containing fluid under predetermined maximum steady state pressure, having a peripheral wall of sufficient thickness to safely withstand said maximum steady state pressure, but subject to tearing in response to transient pressure and initial rupture, and a separate reinforcing band encircling said cylinder in tight relation against said peripheral wall thereof, said band being so narrow relative to the said width of unbanded zones of said cylinder that it is ineffective to prevent rupture of the cylinder by pressure alone, but is effective to halt the extension of tears starting in an unbanded zone, said peripheral wall having an integral external peripheral land underlying said reinforcing band, said band and land having cylindrical contacting surfaces.

References Cited in the file of this patent

UNITED STATES PATENTS

| Number | Name | Date |
|---|---|---|
| 55,791 | Van Duzer | June 19, 1866 |
| 546,140 | Forster | Sept. 10, 1895 |
| 1,125,011 | Draper | Jan. 12, 1915 |
| 1,747,298 | Hassel | Feb. 18, 1930 |
| 2,417,873 | Huber | Mar. 25, 1947 |

FOREIGN PATENTS

| Number | Country | Date |
|---|---|---|
| 182,686 | Germany | Sept. 14, 1905 |
| 507,075 | Great Britain | June 8, 1939 |
| 871,832 | France | Jan. 22, 1942 |